(12) United States Patent
Pulkkinen (10) Patent No.: US 12,507,079 B2
(45) Date of Patent: Dec. 23, 2025

(54) NETWORK PLANNING WITH WALL ATTENUATION

(71) Applicant: Ekahau Oy, Helsinki (FI)

(72) Inventor: Teemu Pulkkinen, Espoo (FI)

(73) Assignee: Ekahau Oy, Helsinki (FI)

( * ) Notice: Subject to any disclaimer, the term of this patent is extended or adjusted under 35 U.S.C. 154(b) by 393 days.

(21) Appl. No.: 17/934,980

(22) Filed: Sep. 23, 2022

(65) Prior Publication Data

US 2024/0107332 A1    Mar. 28, 2024

(51) Int. Cl.
*H04W 16/20* (2009.01)
*H04W 16/18* (2009.01)
*H04W 24/10* (2009.01)

(52) U.S. Cl.
CPC .......... *H04W 16/20* (2013.01); *H04W 16/18* (2013.01)

(58) Field of Classification Search
CPC ..... H04W 16/20; H04W 24/10; H04W 84/12; H04W 8/00; H04W 4/02
See application file for complete search history.

(56) References Cited

U.S. PATENT DOCUMENTS

| | | | | |
|---|---|---|---|---|
| 10,897,687 B2* | 1/2021 | Kwon | ........................ | G01S 5/14 |
| 11,115,833 B1* | 9/2021 | Dennis | .................. | H04W 72/23 |
| 11,349,582 B2* | 5/2022 | Yun | ........................ | H04W 24/08 |
| 11,849,336 B2* | 12/2023 | Kong | .................... | H04W 16/20 |
| 11,877,159 B2* | 1/2024 | Shapiro | ................. | H04W 4/023 |
| 12,081,999 B1* | 9/2024 | Dennis | .................. | H04W 16/32 |
| 2005/0096068 A1 | 5/2005 | Bahl et al. | | |
| 2007/0198227 A1 | 8/2007 | Dundar et al. | | |
| 2014/0057652 A1* | 2/2014 | Palanki | ................. | H04W 4/029 |
| | | | | 455/456.1 |
| 2015/0126213 A1* | 5/2015 | Fayssal | ................. | H04W 4/021 |
| | | | | 455/456.1 |
| 2018/0063738 A1 | 3/2018 | Beluri et al. | | |
| 2018/0102858 A1 | 4/2018 | Tiwari et al. | | |
| 2022/0094777 A1* | 3/2022 | Yeatts | .................... | H04W 24/10 |
| 2022/0196785 A1* | 6/2022 | Eizenberg | .......... | G06K 7/10366 |
| 2023/0328538 A1* | 10/2023 | Kappes | ................. | H04W 16/24 |
| 2023/0341503 A1* | 10/2023 | Vidmar | ............... | H04L 12/2816 |

(Continued)

OTHER PUBLICATIONS

Caso, G., et al., "ViFi: Virtual Fingerprinting WiFi-Based Indoor Positioning via Multi-Wall Multi-Floor Propagation Model", IEEE Transactions on Mobile Computing, vol. 19, No. 6, Nov. 18, 2016, pp. 1478-1491.

(Continued)

*Primary Examiner* — Khawar Iqbal
(74) *Attorney, Agent, or Firm* — Aikin & Gallant, LLP (57) ABSTRACT

In one aspect, a method for planning a wireless data communications (WDC) network includes obtaining information describing an arrangement of a plurality of walls of a physical space in which the WDC network is to be deployed, obtaining a plurality of measured signal strengths of one or more access points taken in the physical space, determining an attenuation of each of the plurality of walls based on the plurality of measured signal strengths wherein the attenuation of each of the plurality of walls are simultaneously determined based on the plurality of measured signal strengths, and generating for input to a display, at least one indication of the attenuation of each of the plurality of walls with the arrangement of the plurality of walls.

20 Claims, 5 Drawing Sheets

(56) References Cited

U.S. PATENT DOCUMENTS

| | | | | |
|---|---|---|---|---|
| 2023/0354261 A1* | 11/2023 | Zhang | ................ | G07C 9/00309 |
| 2023/0361891 A1* | 11/2023 | Ferrari | ................ | H04B 17/391 |
| 2024/0205644 A1* | 6/2024 | Baird | ..................... | G01S 5/021 |
| 2025/0150185 A1* | 5/2025 | Khalid | ................ | H04B 17/347 |

OTHER PUBLICATIONS

Ekahau: How to Measure Wall Attenuation For Spotless Wi-Fi Network Designs, XP093083587, Dec. 15, 2021, pp. 1-3.
International Search Report and Written Opinion received for PCT Patent Application No. PCT/FI2023/050385, mailed on Sep. 28, 2023, 15 pages.
Kubota, R., et al., "Efficient Survey Database Construction Using Location Fingerprinting Interpolation", 2013 IEEE 27th International Conference on Advanced Information Networking and Applications (AINA), Mar. 25, 2013, pp. 469-476.
Office Action received for Finland Patent Application No. 20225952, mailed on Mar. 10, 2023, 9 pages.
Parsons Keith, "Wi-Fi Planning, Walls and dB's-Measuring Obstruction Losses for WLAN Predictive Modelling", XP093083591, Sep. 7, 2015, pp. 1-3.

* cited by examiner

NETWORK PLANNING WITH WALL ATTENUATION

BACKGROUND

A wireless network may include computing devices (e.g., nodes) that communicate with each other using wireless data connections. Each node may have a transmitter or receiver that communicates with the network over radio frequencies (RF). A wireless data communication (WDC) network, such as a wireless local area network (WLAN), links two or more devices through an access point (AP). An access point typically connects to a wired router, switch, or hub via an Ethernet cable, and projects a signal (e.g., a Wi-Fi signal) that covers a given region. For example, an access point may be installed in a living room to provide network coverage in the living room and surrounding areas.

Wi-Fi is a family of wireless network protocols, based on the IEEE 802.11 family of standards, which are commonly used for local area networking of devices and Internet access, allowing nearby digital devices to exchange data by radio waves. Wi-Fi interacts seamlessly with Ethernet, a wired networking technology and standard. Wi-Fi enabled devices can connect to the network through a wireless access point, which may be a multi-band wireless access point. The wireless data communication network provides communication between devices on the network, as well as the Internet. Various versions of Wi-Fi are specified by various IEEE 802.11 protocol standards. The different radio technologies determine the radio bands, the maximum ranges, and the speeds that may be achieved through the network. Frequency bands (e.g., 2.4 GHz, 5 GHz, or 6 GHz) are ranges of radio wave frequencies used to transmit data in the wireless spectrum, and can further be broken down into Wi-Fi channels. These bands are subdivided into multiple channels that each occupy a frequency range in its respective frequency band.

A typical WDC network may include one or more access points that provide wireless access to nodes over a physical space. Multi-band access points are physical access points that may include multiple radios operating in different frequencies. A network planning tool may be used for wireless network planning, to help provide network coverage at desired locations in the physical space, with sufficient bandwidth or throughput. The network coverage and bandwidth (e.g., requirements) may be specified by a user, to suit the user's needs. This may depend on the type of equipment to be on the network, the number of nodes that will be on the network, the anticipated network traffic, the anticipated location of nodes and/or the layout of the physical space itself. A network planning tool may help a user determine the number of APs and locations of APs.

SUMMARY

This disclosure relates to a network planning tool that may determine wall attenuation for walls in a given location, to help plan a wireless data communications (WDC) network for that location. A network planning tool, which may be referred to as a computing device, may determine wall attenuation in a manner that optimizes an overall accuracy of the attenuation estimates of each wall, by finding a best fit of the attenuation estimates to actual measured signal strengths. The wall estimates may be determined simultaneously (e.g., with a common optimization model) to improve overall accuracy of the wall attenuation estimates.

In one aspect, a method for planning a WDC network includes obtaining information describing an arrangement of a plurality of walls of a physical space in which the WDC network is to be deployed, obtaining a plurality of measured signal strengths of one or more access points taken in the physical space, determining an attenuation of each of the plurality of walls based on the plurality of measured signal strengths where the attenuation of each of the plurality of walls are simultaneously determined based on the plurality of measured signal strengths, and generating for input to a display, an indication of the attenuation of the plurality of walls with the arrangement of the plurality of walls. The information describing the arrangement may include where each wall is located in the physical space, the length of each wall, the height of each wall, where each wall starts and ends, and/or the shape of each wall.

In some examples, the attenuation of each of the plurality of walls are determined to fit predicted signal strengths to the plurality of signal strength measurements with minimal error between the predicted signal strengths and the plurality of measured signal strengths. In some examples, determining the attenuation of the plurality of walls may include determining a transmit power of the one or more access points in the physical space based on the plurality of measured signal strengths, and determining the predicted signal strengths based on the transmit power and a free-space distance model. In other examples, determining the attenuation of the plurality of walls includes simultaneously determining the attenuation of each of the plurality of walls and a transmit power of each of the one or more access points, to fit the predicted signal strengths to the plurality of measured signal strengths with the minimal error between the predicted signal strengths and the plurality of measured signal strengths. In some examples, the method may include performing a linear regression algorithm to fit the predicted signal strengths to the plurality of measured signal strengths. The linear regression algorithm may include a least squares regression algorithm. Determining the attenuation of the plurality of walls may include determining, for each wall, a different or specific attenuation for each of a plurality of different frequencies (e.g., for different channels). For example, the method may include determining one attenuation value for each of the 2.4 GHz, the 5 GHz, and the 6 GHz frequency band. In another example, the method may include determining multiple attenuation values (at different frequencies or channels) for each of the 2.4 GHz, the 5 GHz, the 6 GHz frequency band. The wall attenuation may be different from one frequency to another or from one frequency band to another. For example, the wall attenuation may be determined as 'X' dB for 5.2 GHz and 'Y' dB for 5.8 GHz.

In some examples, the plurality of measured signal strengths includes at least one measurement taken between a measurement tool and each of the one or more access points in the physical space without blockage from the plurality of walls. Additionally, or alternatively, the plurality of measured signal strengths may include, for each respective one of the plurality of walls, at least one second measurement between the measurement tool and at least one of the one or more access points, with the blockage from the respective one of the plurality of walls. The method may further include determining, for the input to the display, a model identifier of the one or more suggested access points with respect to the coverage requirements, the attenuation of the plurality of walls, and the suggested location of the one or more suggested access points.

In some examples, the method may include determining a confidence of the attenuation of each of the plurality of walls based on receiving: the at least one measurement taken between the measurement tool and each of the one or more access points without the blockage from the plurality of walls, and receiving: for each respective one of the plurality of walls, the at least one second measurement between the measurement tool and at least one of the one or more access points, with the blockage from the respective one of the plurality of walls.

In some examples, the plurality of measured signal strengths may include multiple frequency bands. For example, access points in the physical space may transmit signals in the 2.4 GHz frequency band, the 5 GHz frequency band, and/or the 6 GHz frequency band.

In some examples, the method may include determining, for the input to the display, a suggested location of one or more suggested access points in the physical space with respect to coverage requirements and the attenuation of the plurality of walls.

In some examples, the one or more access points includes every access point that is present in the physical space, part of the same network (e.g., the same LAN) or both.

In one aspect, the method and examples described may be performed with a Wi-Fi network. In other aspects, the method may be performed with other wireless communication technology such as 5G, Long Term Evolution (LTE) (e.g., private LTE), or other wireless communication technology. As such, an access point may be a Wi-Fi access point, a 5G access point, an LTE access point, or other wireless communication access point. Further, in some examples, a physical wall may include surfaces of physical objects such as furniture, electronics, appliances, or other physical objects.

In one aspect, a computing device for planning a WDC network includes a processor configured to perform the operations described. Other technical features may be readily apparent to one skilled in the art from the following figures, descriptions, and claims.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Wall attenuation may characterize the absorption of radio frequency signals as they come in contact with a given wall. Wall attenuation may be expressed in decibels (dB) or another suitable unit. The higher the attenuation of a given wall, the weaker the WDC signal is after it passes through the wall. Attenuation of a wall may depend on various factors such as wall thickness and wall materials. For example, a wall made of drywall and wood studs may have lower attenuation than a solid concrete wall. Understanding the different materials in a physical space, and their attenuation values, is key for designing a WDC network. A user may strategically place access points in a physical space with knowledge of each wall's attenuation characteristic.

A network planning tool (e.g., a computing device) may determine whether coverage is sufficient at various locations of a given physical space. This may include determining a wall attenuation measurement of each of the walls in a physical space. In some examples, the network planning tool may perform simulations that determine network coverage with one or more simulated access points in the physical space. The wall attenuation measurements may be used in such simulations to simulate the distance or region of coverage from one or more access points in view of each wall (and its respective attenuation). Additionally, or alternatively, a user may utilize the wall attenuation measurement of the walls to strategically plan the number or location of access points, or to configure the access points differently (e.g., to select operating channels and/or frequency bands) based on experience.

With a conventional network planning tool, a user may manually calculate wall attenuation in a physical space by taking individual measured readings and calculating attenuation of each wall in the physical space separately, one wall at a time. Such a process may be cumbersome. Further, such a process may not account for the interaction of the signal with multiple walls at the same time nor does such a process consider the same wall being measured with different signals at different locations. As such, conventional network planning tools may not deduce a "global" solution that leverages a signal strength reading to determine wall attenuation with optimized accuracy.

Improvements in conventional network planning tool may be realized by providing a network planning tool that calculates wall attenuation with improved accuracy in an automated and efficient manner. Wall attenuation for multiple walls in a physical space may be solved using a set of measurements. An optimization process may be performed that uses multiple measured signal strengths from the environment to solve the wall attenuation for each wall simultaneously, in a way that best fits the wall attenuation to the measured signal strengths. As part of the process, access point transmit powers may also be estimated.

Figure 1:
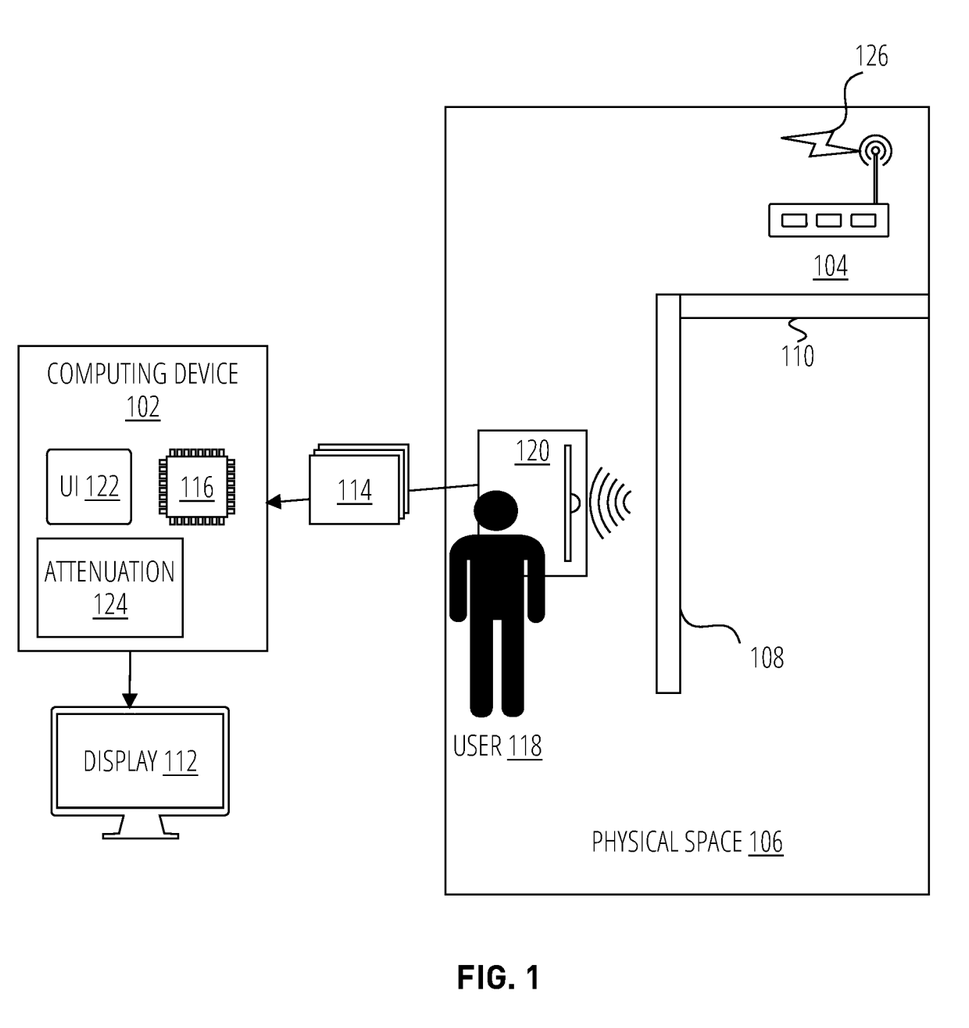
FIG. 1 shows an example of a computing device with wall attenuation estimation, in accordance with some embodiments.

FIG. 1 shows an example of a computing device 102 with wall attenuation estimation, in accordance with some embodiments. Computing device 102 may be referred to as a network planning tool for a wireless data communication network. Computing device 102 may include means to perform various operations described. For example, computing device 102 may include processing logic 116 which may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Processing logic 116 may obtain information describing an arrangement of a plurality of walls (e.g., walls 108, 110) of a physical space 106 in which the WDC network is to be deployed. The information may include how many walls are present, where each wall is present, and the position of each wall (e.g., where in the physical space 106 that each wall starts and ends). The WDC network may include one or more access points 104 placed in the physical space 106. One or more access points 104 may be part of the same network (e.g., in the same LAN) or distributed through a plurality of networks (e.g., on different LANs).

Processing logic 116 may obtain a plurality of measured signal strengths 114 of the one or more access points 104. These measured signal strengths 114 may be captured in the physical space 106 by a signal strength measurement device 120. In some examples, a user 118 may cause the measured signal strengths 114 to be communicated from the signal strength measurement device 120 to the computing device 102. For example, user 118 may operate a user interface 122 to download the measured signal strengths 114 from the signal strength measurement device 120 (or another device) to the computing device 102. The user interface 122 may be integral to computing device 102, or signal strength measurement device 120, or a remote device. User interface 122 may include a graphical user interface, which may include a display such as display 112. The user interface 122 may include other input devices such as a keyboard, a mouse, buttons, switches, a touchscreen display, or other input devices or a combination thereof.

The user 118 may use user interface 122 to provide, as input to the computing device 102, a layout of the physical space 106. This input may include dimensions of the physical space, or shape of the physical space, or both. This may include locations of one or more walls such as walls 108 and 110, in the physical space. Each wall may partially or completely separate regions of the physical space. Further, the user 118 may input locations of the one or more access points 104 in the physical space 106.

The user interface 122 may provide input fields or drawing tools that take the various inputs from the user. The network planning tool may render the layout of the physical space through the display 112. The layout may be shown as a plan view, a perspective view, and/or other visual representation of the physical space 106 that indicates the shape and/or dimensions of the physical space and its various components such as access point locations and walls. The computing device 102 may provide instructions to the display 112 to indicate to the user where to take measurements in the physical space. The user may input (e.g., through the GUI) various measured signal strengths 114 taken at different locations in the physical space which may cover different channels (e.g., different frequencies). In some examples, the signal strength measurement device 120 may perform a sweep of all channels or all active channels at each respective measurement location in the physical space 106.

Processing logic 116 may determine an attenuation 124 of each of the plurality of walls such as walls 108 and 110 based on the plurality of measured signal strengths 114. For example, processing logic may determine that wall 108 has an attenuation of 'x' dB and wall 110 has an attenuation of 'y' dB. The attenuation 124 of each of the plurality of walls may be simultaneously determined (e.g., with respect to each other) based on the plurality of measured signal strengths.

For example, the attenuation 124 of each of the plurality of walls may be simultaneously determined to fit predicted signal strengths to the plurality of measured signal strengths with minimal error between the predicted signal strengths and the plurality of measured signal strengths. The predicted signal strengths may correspond to each location of measured signal strengths 114. Each predicted signal strength may be modeled from a transmit power 126 of each access point 104 and a distance between the access point and the location of measurement, which may be common among a predicted and measured signal strength pair. In some examples, the attenuation 124 of each wall may be determined simultaneously for each wall for a respective frequency based on the measured signal strengths at that frequency. For example, the attenuation at 5.2 GHz for each wall may be determined simultaneously based on the measured signal strengths at 5.2 GHz and predicted signal strength at 5.2 GHz. A different attenuation for 5.8 GHz may be determined simultaneously for each wall based on measured signal strengths at 5.8 GHz and the predicted signal strength at that frequency, and so on.

In some embodiments, at least one of the measured signal strengths 114 may include a signal that passes through multiple walls such as wall 108 and 110. By simultaneously fitting each of the wall attenuations to the actual measured signal strength (e.g., by fitting the predicted signal strengths to the actual signal strength measurements), processing logic may determine a 'best fit' for the wall attenuations that yield such predicted signal strengths, to the measured signal strengths 114. Each measured signal strength may yield slightly different results for a given wall attenuation measurement. By considering the measurements together with each wall attenuation as a whole, error of one calculation may be spread among the various wall attenuations. Overall accuracy of the determined wall attenuations 124 may be improved.

Processing logic 116 may generate for input to a display 112, an indication of the attenuation of the plurality of walls with the arrangement of the plurality of walls. This may include a symbolic or graphical representation of the wall attenuation. For example, the wall attenuation may be presented as a value (e.g., 'x' dB for wall 108, 'y' dB for wall 110). In some examples, this may be expressed as a color or brightness. In some examples, the indication of wall attenuation 124 may be presented as an area of network coverage. For example, processing logic may graphically render a view showing the physical space, as well as an area of coverage that may be simulated based on the wall attenuations 124 and one or more simulated access points, which may be the same or different from the one or more access points 104. Based on the coverage indicated in the tool, a user such as user 118 may move existing access points such as one or more access points 104, or add new access points to improve network coverage in the physical space 106.

In some examples, processing logic 116 may determine a transmit power 126 of the one or more access points 104 in the physical space based on the plurality of measured signal strengths. The transmit power 126 may be used to determine the predicted signal strengths based on the transmit power and a free-space distance model. A free-distance model may include a physical relationship or law that defines how radio frequency waves dissipate with respect to distance over a given medium (e.g., air, a vacuum, or other medium). Transmit power 126 may be determined based on at least one free-space measured signal strength taken between the signal strength measurement device 120 and a respective access point 104. The free-space measured signal strength may a measured signal strength that is free of wall blockage (e.g., a clear path is present between the signal strength measurement device 120 and access point 104 at the time of measurement). Using the free-space measured signal strength, and the free-space distance model (which describes a power loss with respect to distance over a free-space medium), the transmit power 126 may be calculated.

With the predicted signal strength, processing logic 116 may determine an attenuation 124 for each wall that best fits the determined transmit power 126 to the plurality of measured signal strengths 114. As described, processing logic 116 may solve for each of the wall attenuations (e.g., the wall attenuation of 108 and 110) simultaneously with all of the measured signal strengths 114, so that measurements that include one of the walls may be considered with another measurement that include two of the walls, and so on. The wall attenuations that best fit the predicted signal strength to the measured signal strength are solved for and saved as attenuations 124. A predicted signal strength at a given location may be modeled as a function of transmit power dissipated by the loss over a known distance where that loss has a contribution of free-space loss and possibly, a loss due to wall attenuation (if the measured signal is blocked). With the distance and transmit power, processing logic may calculate the wall attenuation of a given wall so that the predicted signal strength most closely fits to the measured signal strength at a given location (e.g., with minimum error). Processing logic 116 may solve for all wall attenuations simultaneously (with every measured signal strength 114) using an optimization algorithm (e.g., linear regression, gradient descent, or another optimization algorithm) to best fit each of the predicted signal strengths at each measurement location to the actual measured signal strengths 114 at those locations.

In some embodiments, processing logic 116 may simultaneously determine the attenuation of each of the plurality of walls and a transmit power of each of the one or more access points, to fit the predicted signal strengths to the plurality of measured signal strengths with the minimal error between the predicted signal strengths and the plurality of measured signal strengths. For example, rather than calculating the each of the transmit power 126 of each access point first, and then using those to simultaneously calculate the wall attenuation, processing logic 116 may simultaneously determine the transmit power 126 of each of the one or more access points 104, with the wall attenuation 124 of each wall, using the measured signal strengths 114 and an optimization algorithm (e.g., linear regression).

Determining the attenuation 124 of each wall may include performing a linear regression algorithm to fit the predicted signal strengths to the plurality of measured signal strengths 114. The linear regression algorithm may model the relationship between the attenuation 124 and predicted signal strength. The linear regression algorithm may include a least squares algorithm. For example, the linear regression algorithm may find a least squares solution that best fits the predicted signal strength to the measured signal strength at respective locations. The linear regression algorithm may include a simple linear regression or a multiple linear regression.

As such, processing logic may find the best fit between what has been modeled in the environment (access point locations and wall elements), and measurements using an optimization algorithm (e., least squares fitting). Processing logic may essentially model what the expected signal strength should be (e.g., the predicted signal strength) given the distance between the measurement point and the access point, and attribute the deviation from this expectation (with respect to the measured signal strengths) to the attenuative properties of the wall elements in the path of the signal. As part of the calculation processing logic may estimate the transmit power of each access point radio.

In some embodiments, the plurality of measured signal strengths 114 may include multiple frequency bands. For example, at one or more measurement locations, the signal strength measurement device 120 may measure signal strength of a first signal that is in the 2.4 GHz band, a second signal that is in the 5 GHz band, and a third signal that is in the 6 GHz band.

In some embodiments, confidence bounds for the fit or the estimated attenuation values are calculated. These confidence bounds may be used to inform the user about attenuation values that are uncertain, such as when the confidence does not satisfy a pre-defined threshold.

As such, computing device 102 may perform automated attenuation calculation using measured signal strength in the physical space, and transmit power estimation. In some examples, processing logic 116 may apply "non-negative" constraints to the solution. For example, processing logic may force all attenuation to be positive, in line with the physical model of radio wave propagation.

Figure 2:
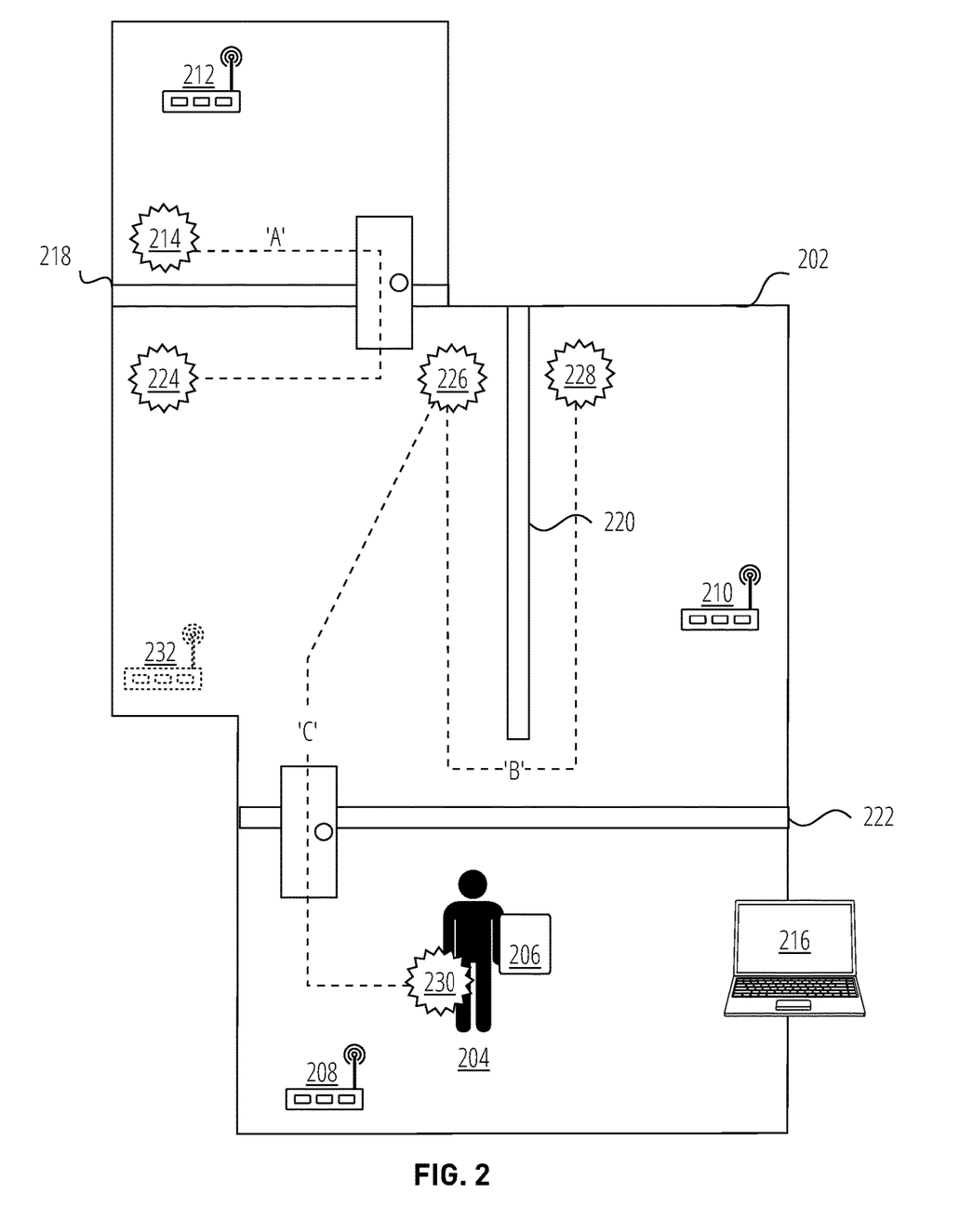
FIG. 2 shows an example of a computing device that may perform network planning for an example physical space, in accordance with some embodiments.

FIG. 2 shows an example of a computing device 216 that may perform network planning for an example physical space 202, in accordance with some embodiments. Computing device 216 may correspond to computing device 102.

A user 204 may input parameters of a physical space 202 to computing device 216 that describes the layout of physical space 202, its dimension and shape, and information about walls that may be present within the physical space 202 such as walls 218, 220, and 222. The user may also enter location of each access point such as access points 208, 210, and 212.

Each access point may include one or more radios that are capable of transmitting a network signal. For example, access point 208 may include a 2.4 GHz radio that can transmit a network signal over a channel in the 2 GHz frequency band, a 5 GHz radio that can transmit a second network signal over a second channel in the 5 GHz frequency band, and a 6 GHz radio that can transmit a third network signal over a third channel in the 6 GHz frequency band.

A user 204 may operate a measurement device 206 to measure signal strength of various channels at given locations in the physical space 202. User 204 may operate measurement device 206 to scan across active channels at various locations (e.g., along path 'A', 'B', and 'C') in the physical space 202. The physical space 202 may be an indoor space, an outdoor space, or both. The physical space 202 may include one or more access points such as access points 208, 210, and 212. Some or all of the access points may be multi-band access points. Each of the access points 208, 210, and 212 may be communicatively coupled to form a wireless network (e.g., WLAN). They may be in the same wireless network or in different wireless networks. The APs may have the same service set identifier (SSID), or different SSIDs.

A wireless data communication network may include a plurality of frequency bands each subdivided into a plurality of channels. A channel of the wireless network may occupy a predefined (e.g., standardized) frequency range of a frequency band. For example, the 2.4 GHz frequency band may include up to 14 channels, each channel being spaced 5 MHz apart and 20 MHz wide. In the 5 GHz band, the number of channels may range from 36 up to 165, or more, depending on channel width. In the 6 GHz band, the number of channels may range from 1-233 (depending on channel width). The number of channels may also vary depending on other factors such as which country the network is operating in.

The device 206 may sense signal strength at various channels of interest (e.g., channels that are determined to have activity) scanning up and down all of the channels (or every active channel) while the user walks through the physical space 202, (e.g., on paths 'A', 'B', and 'C').

In some embodiments, measurement device 206 or a remote device may associate the network signal strength with a location of the device. For example, one or more network signal strengths that are determined at location 214 may be tagged with metadata indicating a location at which the measured signal strength was performed. The location may be determined based on user input, localization, or a combination thereof. The network signal strengths and metadata may be stored locally on device 206, or on a remote device, or both. The measured signal strengths determined at each of the locations along path 'A', 'B', or 'C', may be stored with the location at which that network signal strength is measured, to provide a mapping between the measured signal strength and each measurement location in the physical space 202.

Computing device 216 may have means to obtain an arrangement of a plurality of walls of a physical space in which the WDC network is to be deployed. As described, this may include a user input such as a GUI and/or other user input device, that user 204 may use to input the parameters of the physical space. The arrangement of the plurality of walls as well as other characteristics of the physical space (e.g., the shape and size of the physical space) may be obtained through other methods. For example, the computing device 216 may obtain such parameters through a database, from sensors (e.g., cameras), or a combination thereof.

Computing device 216 may obtain a plurality of measured signal strengths of one or more access points taken in the physical space. Measurement device 206 may be communicatively coupled to computing device 216 such as over a computer network. User 204 may operate the measurement device 206 to measure signal strengths along the path between location 222 and 224 in the physical space. Similarly, measured signal strengths may be captured along the path between location 228 and 226, and between 226 and 230. Each of the measured signal strengths may be timestamped. A user may enter the location of the measured paths in the physical space 202 through the user interface. Based on the timestamps of each measured signal strength, computing device 216 may determine the location of each measured signal strength in the physical space. Additionally, or alternatively, computing device 216 may obtain location information of the measurement device 206 that is associated with each timestamped measured signal strength, to obtain the location that is associated with each measured signal strength.

For example, computing device 216 may obtain a number of measured signal strengths that are sensed along the path between location 214 and location 224. Each measurement may represent a signal strength for a given signal over an active channel at a location along the path. Measurements for multiple signals may be measured at the same location. Each signal may be transmitted from a radio of an access point. For example, at location 'A', measured signal strengths may be taken for a first signal from access point 208, a second signal from access point 210, and a third signal from access point 212. Each signal may be transmitted over a different channel. The measurement device 206 may measure the strength of signals at various locations along each path to collect the measured signal strengths.

Computing device 216 may determine an attenuation of each of the plurality of walls such as wall 218, wall 220, and wall 222, based on the plurality of measured signal strengths. The attenuation of each of the plurality of walls such as wall 218, 220, and 222, may be simultaneously determined based on measured signal strengths provided by measurement device 206. The attenuation of each wall may be determined to fit predicted signal strengths to the plurality of measured signal strengths with minimal error between the predicted signal strengths and the plurality of measured signal strengths.

As described, a predicted signal strength may be modeled based on the relationship between a transmit power of an access point, a distance between the access point and the measurement device 206, and attenuation between the measurement device 206 and the access point. In particular, the computing device 216 may calculate the attenuation of a wall, if a wall is present in the measurement path, to fit the predicted signal strength at a given location to a measured signal strength at the location, and do this simultaneously for all walls with all measurements at different locations. For example, measurements taken along path 'A', path 'B', and path 'C' may individually yield different attenuation levels for each wall. By performing a simultaneous 'best fit', the attenuation levels as a whole are best fit to the measured data.

Computing device 216 may use linear regression to simultaneously calculate the wall attenuation of each wall. In some examples, computing device 216 may minimize the sum of the squares of the residuals made in the results of each individual wall attenuation calculation, where each residual may be expressed as the difference between the predicted signal strength and the corresponding measured signal strengths which may also be referred to as actual measured signal strengths. The result may provide an optimized set of attenuation values, one for each wall.

Computing device 216 may generate, for input to a display, an indication of the attenuation of the plurality of walls with the arrangement of the plurality of walls. As described, computing device 216 may render a graphical representation of the physical space 202 which may include the shape, size, dimensions, and/or other qualities of the physical space 202. Further, the rendering may include positions of walls and positions of existing access points, as well as network coverage in the physical space (e.g., as an overlaid painted region).

In some embodiments, the plurality of measured signal strengths includes at least one signal measured signal strength taken between a measurement tool and each of the one or more access points in the physical space without blockage from the plurality of walls. For example, physical space 202 may include access points 212, 210, and 208. Computing device 216 may obtain at least one measured signal strength of access point 212 without blockage from wall 218 or any other wall.

Additionally, the computing device 216 may obtain at least one measured signal strengths of access point 210 without blockage from wall 220 (or any other wall). This may be repeated for each of the access points in the physical space 202. Further, for each respective one of the plurality of walls, computing device 216 may obtain at least one measured signal strengths between the measurement device 206 and at least one of the one or more access points, with the blockage from the respective one of the plurality of walls. As such, for wall 218, computing device 216 may obtain at least one measurement along path 'A' that has a direct measurement of an access point (such as access point 212), and at least on measurement (along path 'A') that has a blocked measurement of that access point such that wall 218 blocks the path to access point 212. Similarly, measured signal strengths may be taken along both sides of wall 220 so that at least one measurement is not blocked and at least one measurement is blocked by wall 220, and so on. In some examples, computing device 216 may indicate a path to the user on which the user may scan for measured signal strengths.

In some examples, computing device 216 may determine a confidence of the attenuation of each of the plurality of walls based on whether or not the number or locations of the measured signal strengths obtained are sufficient to determine the wall attenuation of each wall to a desired accuracy. For example, this confidence may be based on one or more criteria such as i) receiving at least one measurement taken between the measurement tool and each of the one or more access points without the blockage from the plurality of walls, and ii) receiving, for each respective one of the plurality of walls, the at least one second measurement between the measurement tool and at least one of the one or more access points, with the blockage from the respective one of the plurality of walls.

For example, if the user takes measurements along each side of each wall, and includes a direct measurement to each access point, the confidence may be determined to be sufficient. If, for example, measurements along path 'A' are not taken, the confidence of the attenuation value for all walls may be determined as low.

In some examples, the computing device may indicate the confidence to the user if the confidence level falls below a threshold (e.g., if it does not satisfy each of the one or more criteria). In some examples, if insufficient number of measurements are taken (e.g., less than two values with wall blockage, per wall), then the confidence may be shown as reduced. Computing device 216 may indicate the confidence value symbolically (e.g., a number, a letter, a word), or visually (e.g., a color, shape, etc.). In some embodiments, the one or more access points may include every access point that is present in the physical space. As such, computing device 216 may obtain at least one unblocked measurement for each access point, and at least one blocked measurement for each access point. If the number of measurements is insufficient, or the locations of the measurements are insufficient, or both, computing device may provide instructions to user 204 to perform additional measurements. In some embodiments, the computing device 216 may indicate to the user where to perform the measurements to improve the wall attenuation confidence.

In some embodiments, computing device 216 may generate, as input to a display, a suggested location of one or more suggested access points in the physical space with respect to coverage requirements and the attenuation of the plurality of walls. For example, user 204 may define coverage requirements that describe where in the physical space 202, coverage is to be present, or how much bandwidth should be available, or both. Based on the determined attenuation of each of the walls, computing device 216 may suggest that another access point 232 be placed at a location in the physical space 202, or that one of the existing access points be moved to a different location, or both, to satisfy the coverage requirements. In some examples, coverage requirements may be obtained from a database or from configurable settings.

In some embodiments, computing device 206 may determine, for the input to the display, a model identifier of the one or more suggested access points. For example, computing device 206 may select a model of an access point to add to the physical space 202 or replace an existing access point of the physical space 202. This model may have increased coverage, selected with respect to the coverage requirements and the attenuation of the plurality of walls. The coverage provided by each access point may be determined based on its transmit power, the attenuation of its transmitted signal (from walls and free space). An access point may have multiple radios, each may have its own transmit power. As such, each radio may be treated as an access point.

In some examples, a heat map of a network signal strength in physical space 202 is determined based on the measured signal strength at each of a plurality of different locations of the environment. A heat map may provide a visual indication such as variations in brightness, color, or other visual indicator which may be overlaid on a map of the region of interest, to show strength of the network signal at various locations on the map. The heat map may be presented to a display, which may be integral to the measurement device 206, computing device 216, or on a remote device. In some embodiments, computing device 216 and measurement device 206 may be integrated as a single device.

Figure 3:
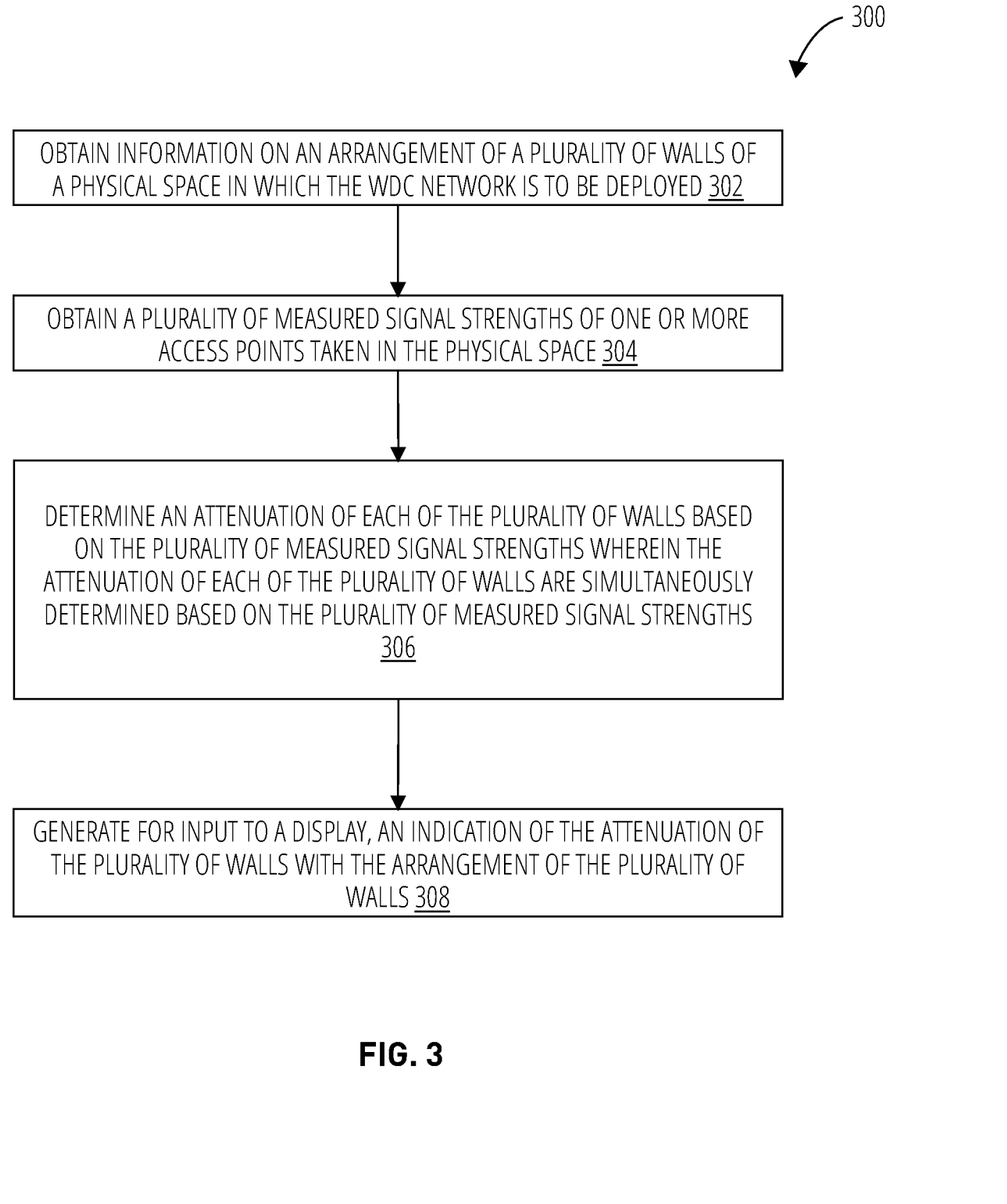
FIG. 3 illustrates a method for planning a wireless data communication network with wall attenuation estimation, in accordance with some embodiments.

FIG. 3 illustrates a method 300 for planning a wireless data communication network with wall attenuation estimation, in accordance with some embodiments. The method may be performed with various aspects described. The method may be performed by processing logic of a computing device (e.g., 102 or 216) or a measuring device (e.g., 120 or 206) that includes one or more radios. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

At block 302, processing logic obtains information on an arrangement of a plurality of walls of a physical space in which the WDC network is to be deployed. This may be performed through user input, as described. The information may include how many walls are present, where each wall is present, and the position of each wall, such as where each wall starts and ends in the physical space.

At block 304, processing logic obtains a plurality of measured signal strengths of one or more access points taken in the physical space. The measured signal strengths may be obtained from a measurement device, either with user interaction, or automatically (e.g., without interaction from a user).

At block 306, processing logic determines an attenuation of each of the plurality of walls based on the plurality of measured signal strengths wherein the attenuation of each of the plurality of walls are simultaneously determined based on the plurality of measured signal strengths. As described, the attenuation may be determined simultaneously to fit predicted signal strengths to the plurality of measured signal strengths with minimal error between the predicted signal strengths and the plurality of measured signal strengths. Processing logic may perform an optimization algorithm (e.g., linear regression, gradient descent, or another optimization algorithm) to simultaneously find the wall attenuation measurements that best fit the measured signal strengths.

At block 308, processing logic generates for input to a display, an indication of the attenuation of the plurality of walls with the arrangement of the plurality of walls. This may include rendering a map showing the physical space and the walls with their respective attenuation values (e.g., symbolically or visually). A user may use this information to move or add access points, to provide the desired coverage in the physical space. In some examples, at block 308, processing logic may display the indication of the attenuation of the plurality of walls with the arrangement of the plurality of walls to a display such as an electronic screen, projection, television, computer video monitor, liquid crystal displays (LCD), light emitting diode (LED) display, or any other similar electronic, computer generated or digital technology.

In some embodiments, processing logic may use the wall attenuation values to perform a simulation with a moved or added access point. The moved or added access point may be suggested at a given location to provide coverage that satisfies a coverage requirement.

In some embodiments, the method and examples described in the present disclosure may be performed with a Wi-Fi network. In other aspects, the method may be performed with other wireless communication technology such as 5G, Long Term Evolution (LTE) (e.g., private LTE), or other wireless communication technology. As such, an access point may include a Wi-Fi access point, a 5G access point, an LTE access point, or other wireless communication access point, depending on the application of the method. Further, in some examples, a physical wall may include surfaces of physical objects such as, for example, furniture, electronics, appliances, or other physical objects in the physical space. In other examples, physical walls may include walls that form rooms or partitions in the physical space (e.g., walls that are fixed to the physical environment such as being part of a building or office space) and may exclude other physical objects that are not walls.

Figure 4:
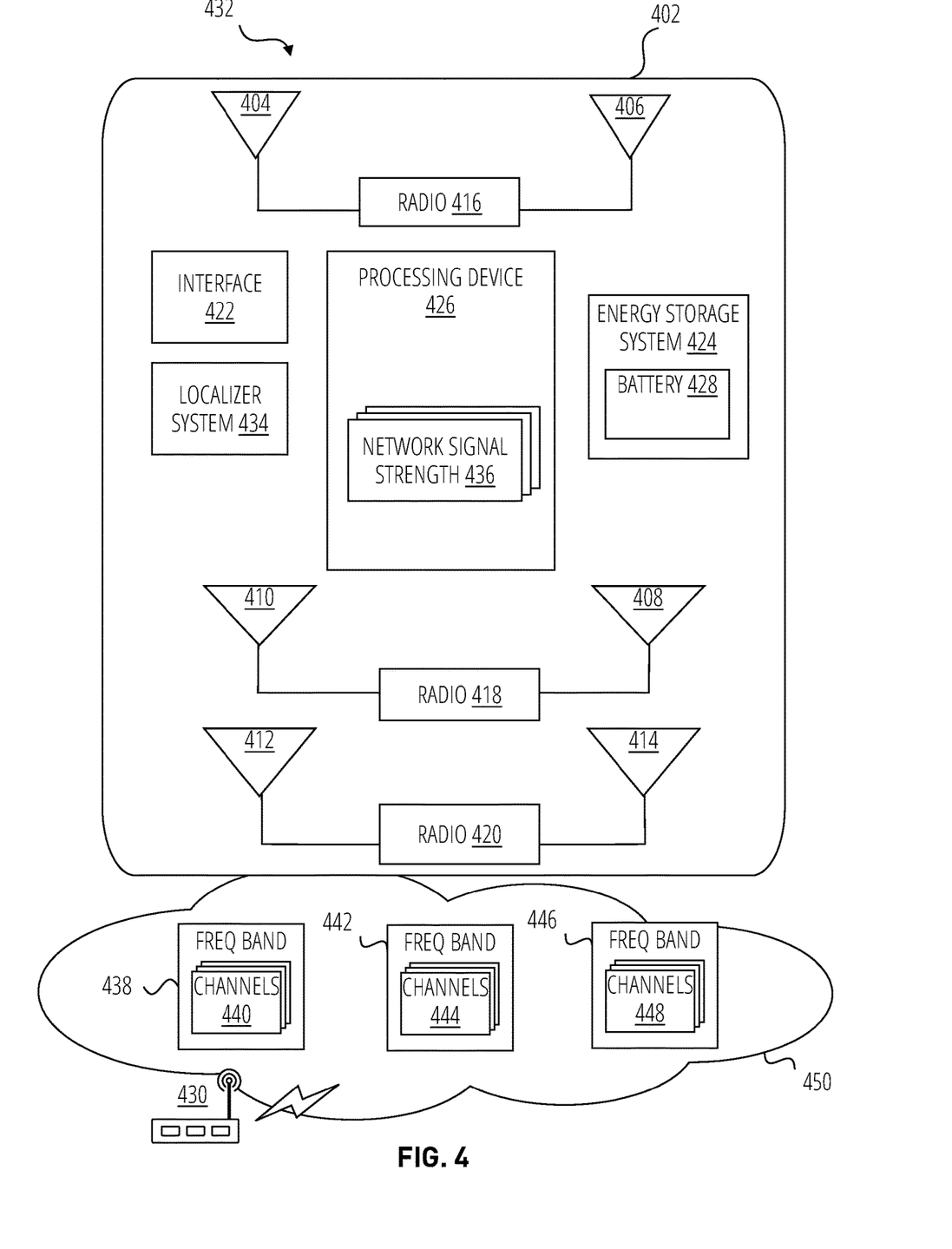
FIG. 4 shows an example of a network measurement device, in accordance with some embodiments.

FIG. 4 shows an example of a network measurement device 432, in accordance with some embodiments. The network measurement device 432 may perform some or all of the operations or methods described. The network measurement device 432 may correspond to measurement device 120 or 206. In some examples, the network measurement device 432 may be a portable measuring device (e.g., a handheld device, or a wearable device).

The network measurement device 432 may include one or more radios such as radios 416, 418, and 420, and a processing device 426. Each radio may include one or more antennas such as antennas 404, 406, 410, 408, 412, and 414. Each antenna may generate a respective electric signal containing sensed RF energy in the environment of the device. For example, each antenna may sense communications transmitted by access points such as access point 430 over one or more channels. Each antenna may also sense noise, which may be understood as RF energy coming from a non-network source or from a different wireless network.

Each of the radios 416, 418, and 420 may be operated to receive the electric signal from its respective one or more antennas and extract information on a particular channel (e.g., at a frequency or frequency range corresponding to the channel). The radio may sense the signal energy (e.g., a signal strength) of that channel. Signal strength may be determined as a measured amplitude of RF energy at a given frequency range corresponding to the channel. In some examples, a measured signal strength may include a ratio such as a signal to noise ratio that compares the signal strength of a communication with the amount of noise energy picked up. In some instances, the radio may decode one or more messages over a channel, e.g., by decoding the communication through a known protocol.

Each of the radios 416, 418, and 420 may include a Wi-Fi receiver (e.g., a Wi-Fi compatible receiver) that can sense signals on one or more Wi-Fi channels over a Wi-Fi network. The receivers may be compatible with WLAN standards 802.11n, 802.11g, 802.11b and 802.11a, to measure information in networks of the corresponding standards. In other embodiments, the receivers may be compatible with another standard.

Processing device 426 may include processing logic such as hardware (e.g., an electronic circuit, electronic components, passive components, active components, dedicated logic, programmable logic, a processor, a central processing unit (CPU), memory, a system-on-chip (SoC), etc.), software (e.g., instructions running/executing on a processing device), firmware (e.g., microcode), or a combination thereof. Processing device 426 may be standalone within the network measurement device 432, or distributed through various other components, or both. For example, each radio may comprise some or all of the processing logic that forms processing device 426. Processing device 426 may include one or more processors that execute software instructions stored on non-volatile memory to operate the device 432 and its various components as described.

A channel of the wireless network 450 may be a predefined (e.g., standardized) frequency range of a frequency band. For example, a wireless network may include a first frequency band 438 (e.g., a 2.4 GHz frequency band) that is subdivided into dedicated frequency ranges that each represent one of channels 440. The wireless network may include a second frequency band 442 (e.g., a 5 GHz frequency band) that similarly has a second set of channels 444, and a third frequency band 446 (e.g., a 6 GHz frequency band) that has a third set of channels 448. Access point 430 may include multiple radios, each radio may be dedicated to communicate over one of the frequency bands 438, 442, or 446. An access point with three radios may be referred to as a tri-band access point.

The processing device 426 may operate the one or more radios (e.g., 416, 418, and 420) to sweep each of those channels and determine the network signal strength at each of the different plurality of frequency ranges.

Computing device 432 may include a housing or enclosure 402 that houses the various components such as the one or more radios (e.g., radio 416, radio 418, and radio 420), one or more antennas (e.g., antennas 404, 406, 408, 410, 412, 414), the processing device 426, as well as other components. Each antenna may be fixed on the device 432 with a different position (e.g., with a unique direction and/or location).

In some examples, the device 432 may include an interface 422 which may include a button, a touchscreen display, a microphone, etc., to receive user inputs. Interface 422 may include a wired or wireless port to communicate from device 432 to an external device. For example, device 432 may communicate information (e.g., network signal strength) gathered by the measuring device, or be used to update the settings of the device 432, or otherwise interact with external devices. In some examples, a user may operate the device with a second device (e.g., a computer, a tablet computer, a mobile phone, etc.) such as computing device 102 or computing device 216 which may provide user inputs to control the processing device 426 (e.g., to turn scanning on or off).

The network measurement device 432 may include a localizer system 434 that may determine a location of the network measurement device 432. The localizer system 434 may include Wi-Fi position system (WPS) which utilizes sensed characteristics (e.g., signal strength) of various access points and known locations of each access point to determine a location of the computing device. Additionally, or alternatively, the localizer system 434 may include global positioning system (GPS) to determine the location of the computing device. The location of the network measurement device 432 may be used in association with the sensed network signal strength 436 to map out the network signal strength 436 at various locations in a region of interest.

In some examples, the computing device 432 is a battery powered device. The device may include an energy storage system 424 which may include one or more batteries 428 that power the various components of the network measurement device 432. In some embodiments, the batteries may be rechargeable. In some embodiments, the batteries are single-use. The computing device 432 may be a cordless device so that a user may carry the device freely throughout a given space and measure the network signal strength at various locations.

Although not shown, the device may include one or more printed circuit boards and other electronic components connected to the circuit boards. Some of the components may be integral to or distributed throughout other components.

Figure 5:
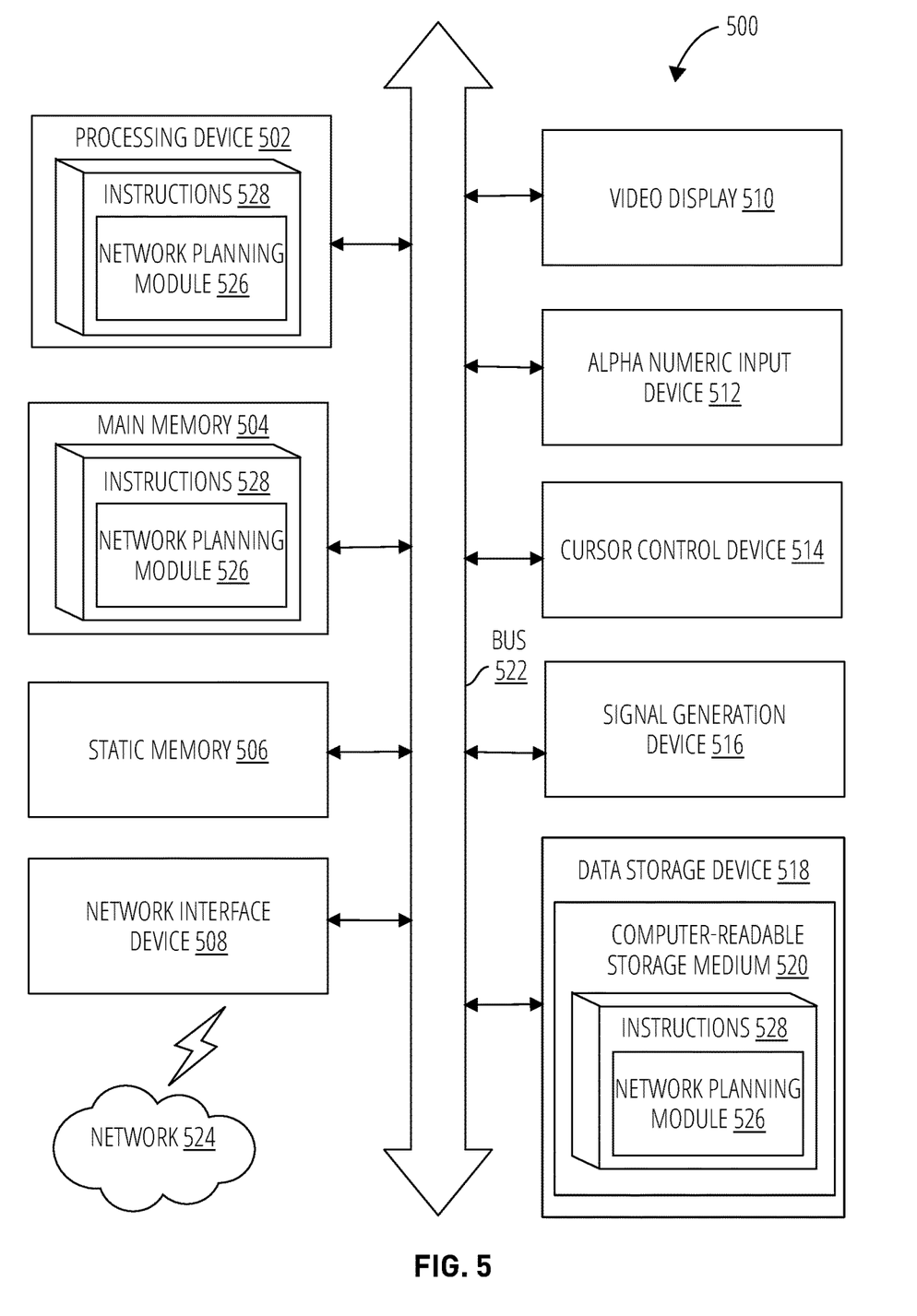
FIG. 5 is a block diagram of an example computing device that may perform wall attenuation estimation, in accordance with some embodiments.

FIG. 5 is a block diagram of an example computing device 500 that may perform one or more of the operations described herein, in accordance with some embodiments. For example, the computing device 500 may correspond to computing device 102 or computing device 216 to operate as a network planning tool that determines wall attenuation with improved accuracy, as described in other sections.

Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device 502 (e.g., a general purpose processor, a PLD, etc.), a main memory 504 (e.g., synchronous dynamic random access memory (DRAM), read-only memory (ROM)), a static memory 506 (e.g., flash memory and a data storage device 518), which may communicate with each other via a bus 522.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a network 524. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 520 on which may be stored one or more sets of instructions 528 that may include instructions for a processing device (e.g., processing logic 116), for carrying out the operations described herein, in accordance with one or more aspects of the present disclosure. Instructions 528 may also reside, completely or at least partially, within main memory 504 and/or within processing device 502 during execution thereof by computing device 500, main memory 504 and processing device 502 also constituting computer-readable media. The instructions 528 may further be transmitted or received over a network 524 via network interface device 508. The instructions 528 may contain instructions of a network planning module 526 that, when executed, perform the operations and steps discussed herein, such as with respect to method 300 or computing device 102 or computing device 216.

While computer-readable storage medium 520 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Various embodiments are described in the present disclosure, including:

1. A method for planning a wireless data communications (WDC) network, comprising: obtaining information on an arrangement of a plurality of walls of a physical space in which the WDC network is to be deployed; obtaining a plurality of measured signal strengths of one or more access points taken in the physical space;

determining an attenuation of each of the plurality of walls based on the plurality of measured signal strengths wherein the attenuation of each of the plurality of walls are simultaneously determined based on the plurality of measured signal strengths; and generating for input to a display, an indication of one or more of the attenuation of each of the plurality of walls with the arrangement of the plurality of walls.

2. The method of embodiment 1, wherein the attenuation of each of the plurality of walls are determined to fit predicted signal strengths to the plurality of measured signal strengths with minimal error between the predicted signal strengths and the plurality of measured signal strengths.

3. The method of embodiment 1 or 2, wherein the plurality of measured signal strengths includes at least one measurement taken between a measurement tool and each of the one or more access points in the physical space without blockage from the plurality of walls.

4. The method of any one of embodiments 1 to 3, wherein the plurality of measured signal strengths includes, for each respective one of the plurality of walls, at least one second measurement between the measurement tool and at least one of the one or more access points, with the blockage from the respective one of the plurality of walls.

5. The method of any one of embodiments 1 to 4, further comprising determining a confidence of the attenuation of each of the plurality of walls based on receiving: the at least one measurement taken between the measurement tool and each of the one or more access points without the blockage from the plurality of walls, and receiving: for each respective one of the plurality of walls, the at least one second measurement between the measurement tool and at least one of the one or more access points, with the blockage from the respective one of the plurality of walls 6. The method of any one of embodiments 1 to 5, wherein determining the attenuation of the plurality of walls includes determining a transmit power of the one or more access points in the physical space based on the plurality of measured signal strengths, and determining the predicted signal strengths based on the transmit power and a free-space distance model.

7. The method of any one of embodiments 1 to 6, wherein determining the attenuation of the plurality of walls includes simultaneously determining the attenuation of each of the plurality of walls and a transmit power of each of the one or more access points, to fit the predicted signal strengths to the plurality of measured signal strengths with the minimal error between the predicted signal strengths and the plurality of measured signal strengths.

8. The method of any one of embodiments 1 to 7, wherein to fit the predicted signal strengths to the plurality of measured signal strengths includes performing a linear regression algorithm.

9. The method of any one of embodiments 1 to 8, wherein the linear regression algorithm includes a least squares regression algorithm.

10. The method of any one of embodiments 1 to 9, wherein the plurality of measured signal strengths includes multiple frequency bands.

11. The method of any one of embodiments 1 to 10, wherein the one or more access points includes every access point that is present in the physical space.

12. A computing device for planning a wireless data communications (WDC) network, comprising: means for obtaining information describing an arrangement of a plurality of walls of a physical space in which the WDC network is to be deployed; means for obtaining a plurality of measured signal strengths of one or more access points taken in the physical space; means for determining an attenuation of each of the plurality of walls based on the plurality of measured signal strengths wherein the attenuation of each of the plurality of walls are simultaneously determined based on the plurality of measured signal strengths; and means for generating for input to a display, an indication of one or more of the attenuation of each of the plurality of walls with the arrangement of the plurality of walls.

13. The computing device of claim 12 further comprising means for carrying out any of the method of any one of embodiments 2 to 11.

14. A computer program comprising instructions which, when the computer program is executed by a computing device, cause the computing device to carry out the method of any one of embodiments 1 to 11.

Some portions of the preceding detailed descriptions have been presented in terms of algorithms and symbolic representations of operations on data bits within a computer memory. These algorithmic descriptions and representations are the ways used by those skilled in the arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computing device, that manipulates and transforms data represented as physical (electronic) quantities within the system's registers and memories into other data similarly represented as physical quantities within the system memories or registers or other such information storage, transmission or display devices.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

What is claimed is:

1. A method for planning a wireless data communications (WDC) network, comprising:

obtaining, by a device, a position and a length of each of a plurality of walls of a physical space in which the WDC network is to be deployed, the device including one or more processors and one or more radios including one or more antennas;

obtaining a plurality of measured signal strengths of one or more access points taken in the physical space, the plurality of measured signal strengths determined from signals sensed by the device using the one or more radios including the one or more antennas in the physical space;

determining, by the one or more processors of the device, a set of attenuation values for the plurality of walls, one for each wall, based on the plurality of measured signal strengths, wherein the set of attenuation values includes, for each wall, a specific attenuation for each of a plurality of different frequencies; and generating for input to a display, by the one or more processors of the device, an indication of the set of attenuation values with the position of each of the plurality of walls.

2. The method of claim 1, wherein the set of attenuation values for the plurality of walls are determined to fit predicted signal strengths to the plurality of measured signal strengths with minimal error between the predicted signal strengths and the plurality of measured signal strengths.

3. The method of claim 2, wherein determining the set of attenuation values for the plurality of walls includes determining a transmit power of the one or more access points in the physical space based on the plurality of measured signal strengths, and determining the predicted signal strengths based on the transmit power and a free-space distance model.

4. The method of claim 2, wherein determining the set of attenuation values for the plurality of walls includes simultaneously determining the set of attenuation values and a transmit power of each of the one or more access points, to fit the predicted signal strengths to the plurality of measured signal strengths with the minimal error between the predicted signal strengths and the plurality of measured signal strengths.

5. The method of claim 2, wherein to fit the predicted signal strengths to the plurality of measured signal strengths includes performing a linear regression algorithm.

6. The method of claim 5, wherein the linear regression algorithm includes a least squares regression algorithm.

7. The method of claim 1, wherein the plurality of measured signal strengths includes at least one measurement taken between a measurement tool and each of the one or more access points in the physical space without blockage from the plurality of walls.

8. The method of claim 7, wherein the plurality of measured signal strengths includes, for each respective one of the plurality of walls, at least one second measurement between the measurement tool and at least one of the one or more access points, with the blockage from the respective one of the plurality of walls.

9. The method of claim 8, further comprising determining a confidence of the set of attenuation values for the plurality of walls based on receiving: the at least one measurement taken between the measurement tool and each of the one or more access points without the blockage from the plurality of walls, and receiving: for each respective one of the plurality of walls, the at least one second measurement between the measurement tool and at least one of the one or more access points, with the blockage from the respective one of the plurality of walls.

10. The method of claim 1, wherein the plurality of measured signal strengths includes multiple frequency bands.

11. The method of claim 1, wherein the one or more access points includes every access point that is present in the physical space.

12. The method of claim 1, wherein the set of attenuation values is determined simultaneously with a common optimization model.

13. The method of claim 1, wherein the indication includes a map showing the physical space and each of the plurality of walls with their respective attenuation values.

14. The method of claim 1, wherein the specific attenuation for each of the plurality of different frequencies includes one attenuation value for each of the 2.4 GHz, the 5 GHZ, and the 6 GHz frequency bands.

15. A computing device for planning a wireless data communications (WDC) network, comprising:
one or more processors;
one or more radios including one or more antennas; and
a memory coupled to the one or more processors storing instructions, which when executed by the one or more processors, cause the one or more processors to:
obtain a position and a length of each of a plurality of walls of a physical space in which the WDC network is to be deployed;
obtain a plurality of measured signal strengths of one or more access points taken in the physical space, wherein the plurality of measured signal strengths is determined from signals sensed using the one or more radios including the one or more antennas in the physical space;
determine, by the one or more processors of the device, a set of attenuation values for the plurality of walls, one for each wall, based on the plurality of measured signal strengths, wherein the set of attenuation values includes, for each wall, a specific attenuation for each of a plurality of different frequencies; and
generate for input to a display, by the one or more processors of the device, an indication of the set of attenuation values with the position of each of the plurality of walls.

16. The computing device of claim 15, wherein the set of attenuation values for the plurality of walls are determined to fit predicted signal strengths to the plurality of measured signal strengths with minimal error between the predicted signal strengths and the plurality of measured signal strengths.

17. The computing device of claim 15, wherein the plurality of measured signal strengths includes at least one measurement taken between a measurement tool and each of the one or more access points in the physical space without blockage from the plurality of walls.

18. The computing device of claim 17, wherein the plurality of measured signal strengths includes, for each respective one of the plurality of walls, at least one second measurement between the measurement tool and at least one of the one or more access points, with the blockage from the respective one of the plurality of walls.

19. The computing device of claim 18, wherein the one or more processors are further configured to determine a confidence of the set of attenuation values for the plurality of walls based on receiving: the at least one measurement taken between the measurement tool and each of the one or more access points without the blockage from the plurality of walls, and receiving: for each respective one of the plurality of walls, the at least one second measurement between the measurement tool and at least one of the one or more access points, with the blockage from the respective one of the plurality of walls.

20. A non-transitory computer-readable storage medium, the computer-readable storage medium including instructions that when executed by a one or more processors, cause the one or more processors to:
- obtain, by a device, a position and a length of each of a plurality of walls of a physical space in which a WDC network is to be deployed, the device including the one or more processors and one or more radios including the one or more antennas;
- obtain a plurality of measured signal strengths of one or more access points taken in the physical space, the plurality of measured signal strengths determined from signals sensed by the device using the one or more radios including the one or more antennas in the physical space;
- determine, by the one or more processors of the device, a set of attenuation values for the plurality of walls, one for each wall, based on the plurality of measured signal strengths, wherein the set of attenuation values includes, for each wall, a specific attenuation for each of a plurality of different frequencies; and
- generate for input to a display, by the one or more processors of the device, an indication the set of attenuation values with the position of each of the plurality of walls.

* * * * *